United States Patent [19]

Jones et al.

[11] Patent Number: 5,409,983
[45] Date of Patent: Apr. 25, 1995

[54] REFILLABLE BOTTLE OF POLYETHYLENE TEREPHTHALATE COPOLYMER AND ITS MANUFACTURE

[75] Inventors: Kenneth M. Jones; Graeme P. Kerr, both of Yorkshire; Neil Tindale, Cleveland, all of England

[73] Assignee: Imperial Chemical Industries PLC, London, England

[21] Appl. No.: 194,641

[22] Filed: Feb. 10, 1994

Related U.S. Application Data

[63] Continuation of Ser. No. 51,286, Apr. 23, 1993, abandoned, which is a continuation of Ser. No. 714,890, Jun. 17, 1991, abandoned.

[30] Foreign Application Priority Data

Jun. 15, 1990 [GB] United Kingdom ................ 9013481

[51] Int. Cl.$^6$ ........................... C08J 5/10; C08K 3/08; C08L 31/08
[52] U.S. Cl. .................................. 524/439; 524/434; 528/283; 528/285; 528/308; 528/308.1; 528/308.2; 215/1 C
[58] Field of Search ................. 524/434, 439; 528/283, 528/285, 308, 308.1, 308.2; 215/1 C

[56] References Cited

U.S. PATENT DOCUMENTS

| | | | |
|---|---|---|---|
| 4,574,148 | 3/1986 | Wicker, Jr. et al. | 528/173 |
| 4,604,257 | 8/1986 | Smith et al. | 264/513 |
| 4,609,721 | 9/1986 | Kirshenbaum et al. | 528/285 |
| 4,692,506 | 9/1987 | Yatsu et al. | 528/296 |

FOREIGN PATENT DOCUMENTS

| | | | |
|---|---|---|---|
| 0041035 | 12/1981 | European Pat. Off. | C08G 63/16 |
| 0102913 | 3/1984 | European Pat. Off. | C08G 63/38 |
| 1293952 | 4/1962 | France . | |
| 1058387 | 2/1967 | United Kingdom | C08G 17/08 |

*Primary Examiner*—Paul R. Michl
*Assistant Examiner*—U. K. Rauguru
*Attorney, Agent, or Firm*—Cushman Darby & Cushman

[57] ABSTRACT

Refillable polyethylene terephthalate (PET) bottles are made by injection stretch blow moulding and comprise a threaded neck of transparent amorphous substantially non-oriented PET; a substantially cylindrical body of transparent biaxially oriented amorphous PET from 0.4 to 0.9 mm thick and an area expansion ratio of at least 7; and a base of transparent amorphous substantially non-oriented or partly oriented PET in which the PET is a polyethylene terephthalate polymer randomly modified by replacing from 1 to 6 mole % of the terephthalate units with units of a chain orientation disrupting aromatic dicarboxylic acid, such as iso-phthalic acid, having an Intrinsic Viscosity of at least 0.75. The polymer particularly includes fine metal particles especially of antimony to reduce the reheat, and optionally includes a level of diethylene glycol residues greater than normally present in PET to improve the blowing performance of the polymer.

18 Claims, No Drawings

REFILLABLE BOTTLE OF POLYETHYLENE TEREPHTHALATE COPOLYMER AND ITS MANUFACTURE

This is a continuation of application Ser. No. 08/051,268, filed on Apr. 23, 1993, which was abandoned upon the filing hereof and which is a continuation of Ser. No. 07/714,890, filed Jun. 17, 1991, now abandoned.

This invention relates to the use of polyesters, in particular modified polyethylene terephthalate polymers in the manufacture of products especially refillable bottles.

Polyethylene terephthalate (PET) is widely used for pressurised bottles for carbonated drinks. At present such bottles are almost all single use bottles, i.e. they are intended to be made, filled with a drink, the drink consumed and the bottle discarded. This mode of operation has proved competitive with single use glass bottles but overall it is not an efficient use of resources and generates much waste and litter. Increasing environmental concerns have led to a search for refillable bottles. In the context of this invention, a refillable bottle is one which is intended to be made, filled with a drink, the drink consumed, the bottle being returned for refilling at least several times before being discarded.

To date bottles made from PET have not proved really satisfactory to meet this requirement. This is not altogether surprising as the performance requirements for such a bottle are much more severe than for a single use bottle. To be satisfactory, a refillable bottle must be capable of surviving a minimum of 20 and preferably more refilling cycles. The filling cycle, for carbonated drinks, typically applies a $CO_2$ pressure of up to 120 lb.in$^{-2}$ gauge (ca. 0.89 MPa gauge) to the bottle before filling to speed dissolution of the $CO_2$ in the drink. The bottle is then filled with the drink which is carbonated and the bottle capped. The equilibrium pressure during storage at ambient temperature (20° to 25° C.) is typically about 55 lb.in$^{-2}$ gauge (ca. 0.38 MPa gauge). Before each refilling, the bottle will be washed under fairly severe conditions e.g. in 3.5% w/w aqueous NaOM at elevated temperatures, typically ca. 60° C. generally for about 15 minutes. Thus, the material of which it is made must be chemically resistant to the washing medium and it must resist to stress cracking promoted by the washing process. The avoidance of stress cracking is particularly important in refillable pressurised bottles as the filling process for carbonated drinks often applies peak pressures to the bottle in excess of the mean pressure during storage after filling and use. Failure at the filling stage is highly undesirable not least for the mess it creates. A further need is that the bottle must not change its size or shape during use. A particularly undesirable form of size change arises from creep of the material of the bottle whilst under pressure e.g. during storage between (re-)filling and consumption of the drink. Creep typically occurs in the cylindrical main wall of the bottle giving an axial expansion and thus increasing the volume of the bottle. As bottle filling lines typically fill by volume, the apparent extent of filling of the level of drink in the bottle on reuse is lower if the bottle has suffered creep. Not surprisingly, consumers much prefer apparently full bottles to bottles which seem 'underfilled'.

The present invention seeks to solve the problems associated with a practically satisfactory refillable PET bottle by using a particular type of modified PET polymer in combination with the injection stretch blow moulding technique of bottle forming and features of the bottle design in the manufacture of such bottles.

Accordingly, the present invention is principally directed to the use of a modified polyethylene terephthalate polymer which is a randomly modified polyethylene terephthalate made by replacing from 1 to 6 mole % of the terephthalate units with units of a chain orientation disrupting aromatic dicarboxylic acid and having an Intrinsic Viscosity of at least 0.75 dl.g$^{-1}$ in an injection stretch blow moulded refillable pressure bottle which comprises:
  i. a threaded neck portion of the modified polyethylene terephthalate polymer which is transparent, amorphous and substantially non-oriented;
  ii. a substantially cylindrical body portion of the modified polyethylene terephthalate polymer which is transparent and biaxially oriented and has a thickness of from 0.4 to 0.9 mm and an area expansion ratio of at least 7; and
  iii. a base portion of the modified polyethylene terephthalate polymer which is transparent, amorphous and substantially non-oriented or partly oriented.

The invention includes an injection stretch blow moulded refillable pressure bottle made of a modified polyethylene terephthalate polymer which comprises:
  i. a threaded neck portion of transparent amorphous substantially non-oriented modified polyethylene terephthalate polymer;
  ii. a substantially cylindrical body portion of transparent biaxially oriented amorphous modified polyethylene terephthalate polymer having a thickness of from 0.4 to 0.9 mm and an area expansion ratio of at least 7; and
  iii. a base portion of transparent amorphous substantially non-oriented or partly oriented modified polyethylene terephthalate polymer; in which the modified polyethylene terephthalate polymer is a randomly modified polyethylene terephthalate made by replacing from 1 to 6 mole % of the terephthalate units with units of a chain orientation disrupting aromatic dicarboxylic acid having an Intrinsic Viscosity of at least 0.75 dl.g$^{-1}$.

The invention further includes a method of making a refillable bottle of the invention which comprises:
  A. injection moulding a blow moulding preform:
    i. which includes a threaded neck portion a wall portion and a base portion of substantially wholly amorphous modified polyethylene terephthalate;
    ii. which has a wall thickness of at least 5 mm; and
    iii. wherein the modified polyethylene terephthalate polymer is a randomly modified polyethylene terephthalate made by replacing from 1 to 6 mole % of the terephthalate units with units of a chain orientation disrupting aromatic dicarboxylic acid, the polymer having an Intrinsic Viscosity of at least 0.75 dl.g$^{-1}$; and
  B. blow moulding the preform to form the bottle so that:
    i. the neck portion is not substantially stretched or oriented and remains of substantially amorphous polymer;
    ii. the wall portion is stretched by an area ratio of at least 7 to give walls which are of transparent biaxially oriented amorphous polymer; and iii. the base portion is stretched by an area ratio of not more than 3 and is of transparent amorphous substantially non-oriented or partly oriented polymer.

We use the term 'pressure bottle' to mean a bottle capable of containing the pressures typical of bottle filling and use in the carbonated drinks industry, which can be satisfactorily cycled many times, in particular substantially without loss of strength, shape distortion or size change.

The modified polyethylene terephthalate polymer used in this invention is a randomly modified polyethylene terephthalate incorporating units of a chain orientation disrupting aromatic dicarboxylic acid to replace some terephthalate units. The aromatic dicarboxylic acid which is the source of the chain orientation disrupting units is one in which the two carboxylate functional groups are not co-linear. This can be achieved by using di-acids in which the angle between the two carboxylate functional groups is significantly different from 180° or in which the carboxyl functional groups are nearly parallel but not co-linear, as in 1,5 and 2,6 substitution patterns round a naphthalene ring system. Examples of suitable aromatic dicarboxylic acids includes iso-phthalic acid (benzene 1,3-dicarboxylic acid), which is particularly useful, naphthalene 2,6-dicarboxylic acid, 2,2-diphenylpropane 4,4'-dicarboxylic acid, 2,2-diphenylmethane 4,4'-dicarboxylic acid, biphenyl 3,4'-dicarboxylic acid and benzophenone 4,4'-dicarboxylic acid.

The dicarboxylic acids used arm aromatic in that the carboxyl functional groups are directly bound to aromatic, particularly benzene or naphthalene, rings. Aliphatic dicarboxylic acids are not suitable as polyesters made using them give products which have inadequate dimensional stability. It is desirable that the dicarboxylic acid residue does not introduce a multicarbon aliphatic residue into the polymer chain as this will tend to make it less effective in disrupting the chain orientation and may make the polymer less stable. In contrast to this, a single aliphatic carbon atom can be included in the overall chain (between aromatic residues carrying the carboxyl groups of the diacid) to provide the source of non linearity as in 2,2-diphenylpropane 4,4'-dicarboxylic acid and 2,2-diphenylmethane 4,4'-dicarboxylic acid.

The proportion of units of the chain orientation disrupting aromatic dicarboxylic acid used is sufficient to reduce the tendency of the PET to crystallise but not so great as to reduce the strength of the PET as to make the bottles susceptible to creep in use. The particular amount will depend on the particular dicarboxylic acid used, but we have found that the proportion of units derived from the dicarboxylic acid (as a percentage of the total acid units used in the polymer) will be in the range of from 1 to 6 mole % and particularly advantageous results have been obtained using proportions in the range 1.5 to 4, especially 1.8 to 3, mole %, especially where the chain orientation disrupting aromatic dicarboxylic acid is iso-phthalic acid.

We have also found that the inclusion of a proportion of diethylene glycol residues to replace some of the usual monoethylene glycol residues can give particular advantages in the manufacture of satisfactory refillable bottles. The normal PET polymerisation process results in the formation of some diethylene and triethylene glycol units incorporated into the polymer. Typical proportions, where the polymer is made by modern continuous polymerisation methods, would be between 2 and 2.5 mole % of the total glycol residues. The level of triethylene glycol is typically much lower than these figures. (The di- and tri-ethylene glycol units may be formed by the linking of chains terminated by glycol residues as well as by etherification of glycol monomer, so there is not necessarily any free di- or tri-ethylene glycol formed during the reaction.) The proportion of diethylene glycol residues to give the best results in this invention is somewhat greater than is typically present as a result of the normal continuous PET polymerisation process as mentioned above. We have obtained good results with proportions of from 3 to 5, particularly about 3.5, mole % of diethylene glycol residues based on the total glycol residues. The diethylene glycol residues are conveniently provided by adding diethylene glycol as a monomer in an amount to increase the normal level of diethylene glycol residues to the level desired according to this aspect of the invention. Alternatively, the PET polymerisation process can be operated to give a higher level of such residues. As the formation of diethylene glycol residues from ethylene glycol (residues) is acid catalysed and the effective concentration of acid is higher if the initial polymerisation of the PET is carried out in a batch process this may give polymers having such higher levels of diethylene glycol residues. The effect of the inclusion of diethylene glycol in the amounts indicated above is to increase the ease with which the polymer flows under typical bottle blowing conditions and to reduce any tendency for polymer to be pulled away from the edge and knee regions of the bottom of the bottle (see below for the importance of this).

The choice of a polymer having a suitable molecular weight is important in achieving good performance in refillable bottles. The common practice in this art is to refer to viscosity data rather than to molecular weight itself. It is recognised that properly normalised viscosity values of similar polymers are reflections of the relative molecular weight of the polymers. Viscosity data quoted herein are Intrinsic Viscosity (IV) figures, quoted as measured in o-chlorophenol at 25° C. In order for the modified PET polymer to have sufficient resistance to crystallisation, the IV of the polymer in the product bottle is at least 0.75 dl.g$^{-1}$ and very desirably at least 0.78 dl.g$^{-1}$. There is no specific upper limit for the IV of the modified PET in the product, but the practical requirements of processing the polymer set an effective upper limit. Generally, during processing (injection stretch blow moulding) the molecular weight, and the IV, of the polymer tend to decrease. Thus, the modified PET polymer before processing will have a minimum IV of 0.75 dl.g$^{-1}$ and almost always the IV will be at least 0.78 dl.g$^{-1}$. The upper limit on IV is determined by the conditions necessary to process the modified PET as the higher the IV (and the molecular weight) the higher the temperature required. For modified PET with an IV much greater than 0.9 dl.g$^{-1}$, the required processing temperatures are so high that the polymer starts to degrade thermally quite rapidly, in particular to yield acetaldehyde which is highly undesirable because it tends to taint foodstuffs subsequently held in the bottle. Thus at present, the practical maximum value of IV is about 0.9 dl.g$^{-1}$. A particularly useful range of IV is from 0.8 to 0.85 dl.g$^{-1}$.

A useful measure of the crystallising tendency can be obtained by examining polymers in a Differential Scanning Calorimeter (DSC). At a controlled rate of cooling from temperatures above or near to the melting temperature of the polymer the measured enthalpy of cooling gives a measure of the crystallising tendency of the polymer. On a Perkin Elmer Mark 7 DSC machine at a cooling rate of 20° C.min$^{-1}$ we have found that a modified PET polymers giving good performance in the manufacture of refillable pressure bottles have a measured enthalpy of less than $-10$ J.g$^{-1}$ and the use of such polymers forms a particular feature of the invention.

The modified PET polymer used in the invention can be made by methods generally known to those skilled in the art. We have successfully made the polymer by first reacting a glycol with a dicarboxylic acid or dimethyl ester to produce a prepolymer compound which is then polycondensed to produce the polyester. If required, the molecular weight of the polyester can then increased further by solid state polymerisation.

The manufacture of the bottles of the invention involves high temperature treatment of the polymer. Such conditions are liable to cause a reduction in molecular weight by hydrolysis as well as the reactions degrading the polymer mentioned above. The presence of water in the modified PET polymer used as the starting material will generally accelerate such hydrolysis reactions and, accordingly, it is very desirable that the polymer is substantially dry and in particular has a water content not greater than about 20 ppm (parts per million) by weight, before use. Maintaining a high molecular weight for the polymer in the bottle has the further benefit that the bottle is less susceptible to hydrolytic degradation during the repeated washings with hot aqueous caustic media that it is expected to meet in the refilling process.

In this invention, the design of the bottle, in particular the distribution of the polymer and the degree of orientation and crystallinity of the polymer in the bottle, is also important. Bottles are made according to the invention by injection stretch blow moulding and the invention includes such a process. Injection stretch blow moulded bottles are made in a two stage process. In the first stage a preform is produced by injection moulding and in the second stage the preform is stretch blow moulded to make the final bottle product. Between the two stages the preform is usually cooled and stored, even if only briefly, until needed for the second, stretch blowing, stage.

The preform takes the form of a 'miniature' bottle, generally being a cylinder closed at one end having a length about a third and an external diameter about a quarter that of the final bottle. In the second stage, the preform is heated (in the so-called 'reheat' step) to an appropriate temperature and is then axially stretched and blow moulded. For example, a bottle having a capacity of 1.5 liter (a very common size) will typically be about 30 cm long and have an external diameter of about 8 to 12 cm. The intermediate preform for such a bottle, would typically be about 10 to 15 cm long and about 3 to 4 cm in external diameter. The preform is the source of the polymer in the final product. The walls and base of bottle according to this invention, are thicker than in conventional PET bottles and so, for bottles of the same size, the preform used in the invention, will have thicker walls than conventional preforms. Typically, the preforms used in this invention have walls 5 to 9 mm thick, much thicker than the 3 to 4 mm typical of conventional bottle preforms.

As is conventional, the preform is, typically, injection moulded with the mould gate in the centre of closed (usually hemispherical) end of the preform which end provides the polymer for the bottle base. As the preform used in this invention has much thicker walls than is conventional, care will be taken to cool it quickly after injection moulding to ensure that the preform is substantially all of fully amorphous material. Particular care is required in the region around the mould gate, typically in the centre of the base, as this is the slowest to cool, particularly when the mould is closed by a sliding gate rather than a sprue (which needs to be removed). This gives the polymer in this region a greater chance of crystallising than elsewhere in the preform. Very slight crystallisation in this region can be tolerated, because (see below) this region of polymer is not stretched very much in blow moulding the bottle, but it should be minimised. This contrasts with conventional bottles, which can have significant crystallisation in this region, visible as opaque streaks or regions of polymer in the centre of the base of the finished bottle. In a conventional bottle, this is less critical because it is not required to withstand the aggressive conditions of washing during reuse. In this invention, it is desirable to avoid or at least minimise any crystallisation in the preform and care will be taken to achieve this. The effect of any crystallisation in the preform can be kept to a minimum by avoiding expanding this region of the preform to a major extent during blowing of the bottle product. The neck portion of the preform is fully moulded at the scale of the final product in fully amorphous polymer.

In this invention, the refillable bottle can be made by the same basic procedure but the distribution of polymer and its orientation are different to those of conventional one trip bottles to obtain the performance required in commercial refillable bottles. For ease of description, the bottle can be considered as having five regions, neck, shoulder, main wall, skirt and base. The main portions are the neck, main wall and base and the shoulder and skirt are transition regions between neck and main wall and base and main wall respectively.

The neck portion of the bottle in the invention is similar to that of conventional one trip PET pressure bottles. Thus it is of amorphous polymer and is formed to provide the (external) thread, usually slotted in carbonated drinks bottles, to engage the bottle top after filling and usually an externally protruding annular disc, below the thread, to enable the bottle to be firmly held during filling and refilling.

In the shoulder the orientation of the polymer generally varies gradually from substantially amorphous adjacent the neck to substantially fully biaxially oriented adjacent the main wall. Correspondingly, the thickness of the polymer decreases from that of the neck to that of the main wall, so that increased thickness provides compensating strength for reduced orientation (as compared with the main wall).

The main wall is the cylindrical body portion of the bottle and is thicker than in conventional single use pressure bottles, typically, being from 0.4 to 0.9 mm as compared with about 0.3 mm in single use bottles. Most usually the main wall will be about 0.6 mm thick. In stretch blow moulding the bottle, the main wall is stretched by an area ratio of at least 7, usually at least 10 and desirably at least 12. This acts to orient the polymer of the cylindrical main wall of the bottle biaxially (axially and circumferentially) to strengthen it to resist the internal pressure generated by pressurised contents and to provide the necessary strength to survive handling through multiple use cycles. Generally, the axial stretch ratio is at least about 2 and particularly about 2.5 and the circumferential ratio is at least 3 and particularly about 4. The main wall is desirably not stretched by an area ratio of more than about 16 and particularly not more than about 14 to avoid excessive orientation which can lead to weakening on the polymer to stress cracking and/or delamination of the main wall, especially as the main wall, of both preform and bottle, is much thicker than in conventional one trip bottles.

The base of refillable bottles made according to the invention differs from that of conventional one trip bottles. In the invention, the base of the bottle is generally inwardly domed ('punted') to improve the protection of the material of the base against impact damage. In bottles according to this invention, the base typically has a punted shape with a ratio of punt height to base diameter of from 4:1 to 8:1, particularly about 6:1. Generally, the bases of conventional PET pressure bottles have an outwardly domed, hemispherical, shape with a separately moulded base stand, or are formed into outwardly domed petal-like shapes (the centre part of such bases may be slightly punted but the base generally protrudes outward from the bottle as a whole), in which the petal-like shapes act to provide a bass stand. The stretching of polymer in moulding conventional base shapes would orient and/or weaken the polymer e.g. by inducing crystallisation and/or increasing its susceptibility to stress cracking, to such an extent as to make it unsatisfactory for refillable bottles.

To avoid generating significant regions of crystallinity in the base during manufacture, the base of the bottle in the invention is less oriented than is conventional. This is important to good performance in the long term as, in use, the repeated cycles of washing in aqueous alkali will be likely to generate stress cracking if the polymer of the base is significantly crystalline or substantially oriented. The regions at the edge between the base and the skirt and the central region of the base, adjacent the mould gate are particularly sensitive in this regard. A reduced level of orientation would give a relatively weakened base and to provide the high level of strength required in the invention, the base is much thicker than in conventional one trip bottles and the base is not generally of uniform thickness or orientation.

Overall, there is a transition from non-oriented amorphous polymer in the central part of the base through the base and skirt to full biaxial orientation in the main wall. Generally, the central part of the base, typically having a diameter of about 2 to 3 cm, has a thickness of from 3 to 6 mm and is stretched scarcely at all during blowing, the stretch ratio is typically from 1 (no stretching) to about 1.5 fold and most usually about 1.2 fold. The annular main area of the base, between the central part and the edge of the base (the 'knee'), is generally somewhat less thick than the central part, an average of about 2.5 mm is typical, and usually gets thinner nearer the knee. The thickness will range typically from 2 to 4 mm, usually about 3 mm nearest the central part and 1.5 to 3 mm, usually about 2 mm nearest the knee. The degree of stretch also varies from typically about 1.5 to 2 fold nearest the central part to 2.5 to 3 fold nearest the knee. In this annular region the orientation is largely uniaxial in a circumferential direction around the base.

The knee typically has a thickness of 1 to 2 mm, particularly about 1.5 mm and is also usually further extended below the general level of the base to form a standing rim for the bottle. The curvature around the knee generally means that the polymer is stretched, mainly unidirectionally, in the axial direction around the knee. The degree of stretching is typically about 3 fold. Over the whole of the base, the thickness of the polymer can mean that the degree of stretching and thus of orientation will vary through the thickness of the polymer. This is likely to be most noticeable around the knee, because the knee is effectively a fold in the polymer with the inside surface folded back on itself, thus making it much less oriented than the polymer stretched around the outside of the knee.

The skirt forms a transition region from the edge of the base, the knee, to the main wall. The gradation of the polymer continues upward from the knee through the skirt for a distance of typically from 2 to 5 cm, particularly about 4 cm. In the skirt the polymer is typically gradually reduced in thickness to that of the main wall and has increased orientation, from stretching, towards the full biaxial orientation of the main wall.

At the start of the second, blow moulding, stage of the process the preform is usually at or near ambient temperature and, thus, has to be reheated to a suitable temperature, typically 90° to 110° especially about 95° C. for blow moulding. The reheat step is usually rate limiting on the second stage of the process. A reduction in this time is valuable in the invention for the increased productivity that it enables, for the avoidance of uneven reheating of the preform which could lead to local overheating and to reduce the chance of (re)crystallisation of the polymer during the second step. The importance of this last point will be appreciated from the previous discussion. In the method of the invention it is especially important because the preform used has much thicker walls which would otherwise require a much longer reheat time and be more susceptible to uneven heating than in the manufacture of conventional one trip PET bottles.

The reheat step is typically carried out using infra red (IR) heaters, such as quartz infra red lamps, which radiate most intensely in the wavelength range 500 to 2000 nm. The intrinsic absorption of PET in this region is very low and any absorption observed usually derives from suspended foreign matter, e.g. catalyst residues and impurities. The absorption arises from a combination of scattering and intrinsic absorption by the suspended matter. Thus, the reheat rate of PET preforms is ordinarily very dependent upon how clean the composition is. Dirty compositions, which have a relatively high haze level from the presence of contaminants, reheat quicker than clean compositions. Pigmented PET can have lower reheat time than unpigmented PET which are required to be clear i.e. to have minimal haze. For clear PET, the level of contaminants required to produce a significant reduction of the reheat time of the composition result in an unacceptable level of haze.

We have found that the reheat times of the polymer can be significantly reduced by including small amounts of fine metal particles reduced whilst retaining an acceptable haze level. In particular, the polymer used contains metal particles, which intrinsically absorb radiation in the wavelength range 500 nm to 2000 nm, in a quantity such that the reheat time of the polymer is less than the reheat time of the polymer in the absence of that quantity of particles. The inclusion of suitable amounts of such fine metal particles in the polymer used in the bottles and in the process of the invention, in particular as described in more detail below, constitute a particular and highly desirable feature of the invention.

The metal particles are typically of antimony, tin, copper or a mixtures of these metals, and especially of antimony. They are desirably sufficiently fine for them not to be visible to the eye and have a range of sizes such that absorption of radiation occurs over a relatively wide part of the wavelength range and not just at one particular wavelength or over a narrow band. The metal particles may be added to the polymer as finely divided metal particles or, alternatively, the metal may be present in the polymer in the form of a reducible compound of the metal and a suitable reducing agent can be added to the polymer.

The proportion of metal particles in the composition at the point of use is a balance between the desired reduction in the reheat time of the polymer and the amount of haze that is acceptable for a given application. Conveniently, the proportion of metal particles is between 3 and 300, more particularly between 5 and 150, especially between 10 and 100, parts per million (ppm) by weight on the polymer. When a reducible metal compound is used, the quantity of reducing agent used will usually be the appropriate stoichiometric amount, if necessary, with an excess to allow for loses arising from scavenging effects such as interaction of the reducing agent with oxygen dissolved in the polymer etc. Suitable reducing agents include phosphorus (III) compounds such as phosphorous acid or triphenyl phosphite.

Antimony is especially preferred as the metal because, in the form of antimony trioxide, it is a catalyst for the polymerisation of the monomers used in the preparation of polyesters. As the environment in the polyester monomer melt is slightly reducing the polyester polymer may naturally have a very minor proportion of antimony metal present, e.g. 1 to 2 ppm. However, these very low levels of antimony metal do not significantly affect the reheat time. It is necessary to increase the amount of antimony metal present in the polymer to a quantity more than these background levels.

As is mentioned above, it is desirable to minimise the exposure of the polymer of the bottle to high temperatures. Thus, the bottles of the invention are blown from the preforms at a temperature typically not more than 110° C., particularly from 80° to 110° C., especially 95° to 100° C.

The use of metal particles in the polymer, described above, is useful not only in reducing the reheat time. It also improves the uniformity of the reheating which lessens the total exposure to heat, thus reducing the chance of undesired crystallisation happening the polymer, and reduces the likelihood of the polymer delaminating on blowing as can happen if the preform is reheated non-uniformly so that the inside and outside have substantially different temperatures.

The use of metal particles in the polymer used in the invention forms a particular feature of the invention. Indeed, the polymer incorporating metal particles is itself an aspect of the invention. In this aspect, the invention includes a modified polyethylene terephthalate polymer which is a randomly modified polyethylene terephthalate made by replacing from 1 to 6 mole % of the terephthalate units with units of a chain orientation disrupting aromatic dicarboxylic acid and having an Intrinsic Viscosity of at least 0.75 and which contains from 3 to 300, particularly form 10 to 100 parts per million by weight of the polymer of finely divided particles of metal, particularly antimony, copper, tin or a mixture of these. Of course, this polymer of the invention can include the particular chain orientation disrupting aromatic dicarboxylic acids in especially desirable proportions, it can include diethylene glycol residues, particularly in the especially desirable ranges and proportions described above, it can have the particular especially desirable ranges and values of IV, it can have the enthalpy properties and it can include metal particles all as more particularly described above and can include other additives as described below.

The PET polymer of and used in the bottles of the invention can also contain other additives which do not adversely affect the polymer, such as catalysts, stabilisers, processing aids, fillers, antioxidants, plasticisers and lubricants. Pigments and/or dyes can be included to make coloured bottles, in particular to obtain green, amber and brown coloured bottles. As the bottles are of substantially non crystalline polymer, additives that promote crystallisation, in particular nucleating agents, will not be used.

As, in use, the bottles will be likely to be exposed to moderately high temperatures, especially during washing on reuse, the polymer of the main wall can be given improved heat strength properties by heat setting. This can be carried out by known means e.g. using heated, or less cooled, moulds in blow moulding the bottles or by a subsequent hot mould treatment.

The invention is illustrated by the following Examples. All parts and percentages are by weight unless otherwise stated.

EXAMPLE 1

Terephthalic acid (98 parts), isophthalic acid (2 parts) and ethylene glycol (45 parts) and sodium hydroxide ($4.6 \times 10^{-3}$ parts) as buffer were placed in a pressure reactor and reacted at a pressure of 40 psig (ca. 0.28 MPa gauge) over a temperature range from 235° to 245° C. with the removal of water by continuous distillation. After 85% of the theoretical amount of water had been removed, the reactor was vented to ambient pressure. Phosphoric acid ($1.94 \times 10^{-2}$ parts) as stabiliser and antimony trioxide ($2.89 \times 10^{-2}$ parts) as catalyst and phosphorous acid ($0.37 \times 10^{-2}$ parts) as reducing agent (to generate ca. 30 ppm antimony metal in the polymer—the phosphorous acid is oxidised to phosphoric acid which adds to the stabiliser) were added to the reaction mix. The mixture was heated to 290° C. over a period of 30 minutes and the pressure was reduced to about 0.1 kPa to continue the polymerisation. When the target molecular weight was reached, as measured by melt viscosity and corresponding to an IV of 0.62, the pressure was raised to ambient and the polymer was extruded as lace and cut up into pellets. The pellets were then subjected to a solid phase polymerisation step in a separate vessel under dehumidified nitrogen at about 220° C. This was continued until the molecular weight of the polymer had increased to the target value, as measured by melt viscosity and corresponding to an IV of 0.82 dl.g$^{-1}$. The polymer contained about 2.6 mole % diethylene glycol residues (based on total glycol residues) and an enthalpy of cooling (at a cooling rate of 20° C. min$^{-1}$) of about $-8$ J.g$^{-1}$.

This modified PET polymer was dried in an air dryer for 6 hours at 185° C. using air having a dew point of $-60°$ C. The dry polymer was then formed into bottle preforms on a Husky XL225 32 cavity injection moulding machine at a barrel temperature of 295° C., a barrel head temperature of 290° C., a shooting pot (holding zone) temperature of 290° C., a manifold temperature of 290° C., a hot runner temperature of 285° C., an injection pressure of 1600 psig (ca. 11 MPa), an injection time of 6 seconds, a mould temperature of 10° C., and an overall cycle time of 60 seconds. The preforms were 152 mm long (from base to neck support), had an outside diameter of 31 mm and weighed ca 108 g each.

The preforms were subsequently formed into bottles by stretch blow moulding. They were first reheated using IR radiation in a Krupp LBO 1 machine for 85 seconds with a 30 second holding time, so that the preforms had a surface temperature of 95° C. (measured using an IR pyrometer). The reheated preforms were then stretch blow moulded to give bottles 315 mm high (from base to neck support and having an external diameter of 83 mm.

Samples of these bottles were subjected to accelerated aging testing by repeated filling, emptying, washing (in 3.5% w/w aqueous NaOH solution at 60° C. for about 15 minutes) and refilling and survived the test well. The test used is somewhat more stringent than 'real life' as the filling involves pre-pressurisation of the bottles and filling with an aqueous solution of sodium bicarbonate and adding sulphuric acid in an amount to generate sufficient carbon dioxide to pressurise the bottles. This pressurises the bottles more quickly and may subject the bottles to higher peak pressures than commercial filling methods as commercial filling is usually carried out using the carbonated drink at sub-ambient temperature which equilibrates to typical storage temperatures fairly slowly.

EXAMPLE 2

A modified PET polymer was made by the general method described in Example 1 but with the following differences. The amounts of terephthalic and isophthalic acids used were 98.1 and 1.9 parts respectively, the catalyst and stabiliser combination used was antimony trioxide ($2.89 \times 10^{-2}$ parts) and cobalt acetate tetrahydrate ($1.85 \times 10^{-2}$ parts) as catalyst and phosphoric acid ($1.73 \times 10^{-2}$ parts) as stabiliser and phosphorous acid ($0.35 \times 10^{-2}$ parts) as reducing agent (to generate ca. 30 ppm antimony metal in the polymer—the phosphorous acid is oxidised to phosphoric acid which adds to the stabiliser). Solid phase polymerisation was continued until the molecular weight of the polymer had increased to the target value, as measured by melt viscosity and corresponding to an IV of 0.835 dl.g$^{-1}$. The polymer had an enthalpy of cooling (at a cooling rate of 20° C. min$^{-1}$) of −7.1 J.g$^{-1}$ and contained about 2.5 mole % diethylene glycol residues (based on total glycol residues).

Samples of this polymer were made into bottles of the general description set out in Example 1 by extrusion blow moulding broadly as described in Example 1 and sample sets of 4 of these bottles were subjected to accelerated refill cycling test as follows. The test simulates use of the bottles as refillable bottles, in particular testing their resistance to typical washing conditions in refill cycling. The total volume of the bottles before testing was measured by filling the bottles to the brim with water and measuring the volume of water in a measuring cylinder (about 1.6 l). The bottles were washed by immersion in an aqueous wash solution of 3% w/w sodium hydroxide and 0.15% w/w of a commercial washing additive believed to contain detergent, antifoam and phosphoric acid (Stabilon PA Al Fleussig from Henkel) at 58.5° C. for 15 minutes and then thoroughly rinsed with water to remove all the sodium hydroxide. The bottles were filled to their nominal capacity (1.5 l) with carbonated water using a Lancaster model carbonation apparatus (from Whitlenge of Halesowen, England) using a nominal supply pressure (at the carbon dioxide cylinder regulator) of about 60 psig (414 kPa) to give a 4-volume fill of carbon dioxide corresponding to a headspace pressure of about 57 psig (393 kPa) at 22° C. and the bottles were capped. The bottles were stored for 18 hours at 37.8° C. (nominally 100° F.) and 30% realtive humidity. The bottles were then emptied and the wash, rinse, fill, store cycle was repeated. The total volume of the bottles was measures after 1, 5 and 25 cycles. The results of this testing are set out in Table 1 below in which the mean volumes of the sets of 4 bottles are given as a function of the number of cycles. For comparison similar bottles made from a PET polymer using 1,4-bis(hydroxymethyl)cyclohexane (cyclohexane dimethanol) to replace part of the ethylene glycol (PET grade EK 9921W from Eastman Kodak) were also tested and the results are included in Table 1. These results show that the bottles of the invention have good resistance to creep on repeated cycling and are significantly superior to the bottles used as controls. Further, none of the bottles in this test failed in testing up to 25 cycles and all were assessed as capable of functioning as bottles for carbonated drinks at the end of the test. All bottles tested showed signs of cracking about the outside bottom rim of the base but the cracks were generally fine and not such as to cause failure during carbonation or storage. In respect of cracking, no significant difference between the bottles of the invention and the control bottles was observed.

TABLE 1

| Ex. No. | Initial Volume (ml) | Percentage increase in volume after | | |
|---|---|---|---|---|
| | | 1 cycle | 10 cycles | 25 cycles |
| 2 | 1595 | 0 | 0.9 | 0.9 |
| 2C | 1590 | 0 | 2.1 | 1.2 |

EXAMPLE 3

A modified PET polymer was made by the general method described in Example 2 but with the esterification step being carried out batch wise and that the amount of phosphorous acid used was $0.47 \times 10^{-2}$ parts. The batch wise esterification operates under relatively more acidic conditions than the continuous conditions (as used in Example 1) and results in a higher proportion of diethylene glycol residues. The resulting polymer was solid phase polymerised until the molecular weight of the polymer had increased to the target value, as measured by melt viscosity and corresponding to an IV of 0.855 dl.g$^{-1}$ and the polymer had an enthalpy of cooling (at a cooling rate of 10° C. min$^{-1}$) of −8.8 J.g$^{-1}$. (The slower cooling rate will give a higher measured value for the enthalpy as compared with a cooling rate of 20° C. min$^{-1}$.). The level of diethylene glycol residues in the polymer product was about 3.4 mole %. Bottles were made from this polymer generally as described in Example 1 and examination of the bottles indicated less of a tendency for the polymer to be moved away from the knee area of the base than with polymers having a lower proportion of diethylene glycol residues. Accelerated refill cycling testing as described in Example 2 showed good resistance to creep.

EXAMPLE 4

A modified PET polymer was made by the general method described in Example 1 except that the amounts of terephthalic and isophthalic acids used were 97 and 3 parts respectively, the amount of phosphoric acid used was $2.89 \times 10^{-2}$ parts, and no phosphorous acid was used (so that no substantial amount of antimony metal particles were formed). The polymer had a melt viscosity corresponding to an IV of 0.82 dl.g$^{-1}$, a level of diethylene glycol residues of about 2.5 mole % and the polymer had an enthalpy of cooling (at a cooling rate of 20° C. min$^{-1}$) of $-0.3$ J.g$^{-1}$. Bottles made, generally as described in Example 1, from this polymer were tested using the accelerated refill cycling test described in Example 2 and showed good resistance to creep. It was noticeable that the reheat time of bottles made using this polymer was longer that with those polymers including metal particles.

EXAMPLE 5

A modified PET polymer was made by the general method described in Example 2 except that diethylene glycol was included as a monomer to give a final total content of diethylene glycol residues of about 3.5 mole %, the polymer had a melt viscosity corresponding to an IV of 0.87 dl.g$^{-1}$, an enthalpy of cooling (at a cooling rate of 20° C. min$^{-1}$) of $-0.7$ J.g$^{-1}$ (and $-2.8$ J.g$^{-1}$ at a cooling rate of 10° C. min$^{-1}$). Bottles made, generally as described in Example 1, from this polymer were tested using the accelerated refill cycling test described in Example 2 and showed good resistance to creep.

We claim:

1. An injection stretch blow moulded refillable pressure bottle made of a modified polyethylene terephthalate polymer which comprises:
   i. a threaded neck portion of transparent amorphous substantially non-oriented modified polyethylene terephthalate polymer;
   ii. a substantially cylindrical body portion of transparent biaxially oriented amorphous modified polyethylene terephthalate polymer having a thickness of from 0.4 to 0.9 mm and an area expansion ratio of at least 7; and
   iii. a base portion of transparent amorphous substantially non-oriented or partly oriented modified polyethylene terephthalate polymer;
in which the modified polyethylene terephthalate polymer is a randomly modified polyethylene terephthalate made by replacing from 1 to 6 mole % of the terephthalate units with units of a chain orientation disrupting aromatic dicarboxylic acid said modified polyethylene terephthalate having an Intrinsic Viscosity of at least 0.75 dl.g$^{-1}$.

2. A refillable pressure bottle as claimed in claim 1 in which the chain orientation disrupting aromatic dicarboxylic acid is one or more of iso-phthalic acid (benzene 1,3-dicarboxylic acid), naphthalene 2,6-dicarboxylic acid, 2,2-diphenylpropane 4,4'-dicarboxylic acid, 2,2-diphenylmethane 4,4'-dicarboxylic acid, biphenyl 3,4'-dicarboxylic acid and benzophenone 4,4'-dicarboxylic acid and in which the chain disrupting aromatic dicarboxylic acid replaces from 1.5 to 4 mole % of the terephthalate units.

3. A refillable pressure bottle as claimed in claim 2 in which the chain disrupting aromatic dicarboxylic acid is iso-phthalic acid and where it replaces from 1.8 to 3 mole % of the terephthalate units.

4. A refillable pressure bottle as claimed in claim 1 wherein the modified polyethylene terephthalate includes from 3 to 5 mole % of units derived from diethylene glycol based on the total glycol units.

5. A refillable pressure bottle as claimed in claim 1 wherein the modified polyethylene terephthalate polymer has an Intrinsic Viscosity of from 0.8 to 0.85 dl.g$^{-1}$.

6. A refillable pressure bottle as claimed in claim 1 wherein the modified polyethylene terephthalate polymer has a measured enthalpy of cooling of less than $-10$ J.g$^{-1}$ (measured using a Perkin Elmer Mark 7 DSC Differential Scanning Calorimeter at a cooling rate of 20° C. min$^{-1}$).

7. A refillable pressure bottle as claimed in claim 1 wherein the modified polyethylene terephthalate polymer used contains fine metal particles, which intrinsically absorb radiation in the wavelength range 500 nm to 2000 nm, in a quantity such that the reheat time of the polymer is less than the reheat time of the polymer in the absence of that quantity of particles.

8. A refillable pressure bottle as claimed in claim 7 wherein the metal particles are of antimony, tin, copper or a mixtures of these metals in an amount of from 3 to 300 parts per million (ppm) by weight on the polymer.

9. A refillable pressure bottle as claimed in claim 8 wherein the metal particles are particles of antimony in an amount of from 10 to 100 parts per million (ppm) by weight on the polymer.

10. A refillable pressure bottle as claimed in claim 7 wherein the metal particles are formed by reduction of a reducible metallic compound with a reducing agent during manufacture of the polymer.

11. A refillable pressure bottle as claimed in claim 10 wherein the metal particles are particles of antimony formed by reduction of antimony trioxide by a phosphorous (III) compound.

12. A method of making a refillable bottle as claimed in claim 1 which comprises:
   A. injection moulding a blow moulding preform:
      i. which includes a threaded neck portion a wall portion and a base portion of substantially wholly amorphous modified polyethylene terephthalate;
      ii. which has a wall thickness of at least 5 mm; and
      iii. wherein the modified polyethylene terephthalate polymer is a randomly modified polyethylene terephthalate made by replacing from 1 to 6 mole % of the terephthalate units with units of a chain orientation disrupting aromatic dicarboxylic acid, the polymer having an Intrinsic Viscosity of at least 0.75 dl.g$^{-1}$; and
   B. blow moulding the preform to form the bottle so that;
      i. the neck portion is not substantially stretched or oriented and remains of substantially amorphous polymer;
      ii. the wall portion is stretched by an area ratio of at least 7 to give walls which are of transparent biaxially oriented amorphous polymer; and
      iii. the base portion is stretched by an area ratio of not more than 3 and is of transparent amorphous substantially non-oriented or partly oriented polymer.

13. A method as claimed in claim 12 wherein the modified polyethylene terephthalate polymer is a polymer containing 3 to 300 parts per million by weight of the polymer of finely divided particles of metal.

14. A method as claimed in claim 12 wherein the temperature at which the bottles are blown is not more than 110° C.

15. A method as claimed in claim 12 wherein the main wall is stretched by an area ratio of at least 10 during blowing to a thickness in the range 0.4 to 0.9 mm, the central part of the base is from 3 to 6 mm thick and has a stretching ratio of from 1 to 1.5, the annular main area of the base, between the central part and the edge of the base (the knee), is from 2 to 4 mm thick and has a stretching ratio of from 1.5 to 3, and the knee has a thickness of 1 to 2 mm and a stretching ratio of about 3.

16. In a method of using a polyester bottle which involves refilling, the improvement which comprises using, as the bottle being refilled, one which is made of a modified polyethylene terephthalate polymer which comprises:
  i. a threaded neck portion of transparent amorphous substantially non-oriented modified polyethylene terephthalate polymer;
  ii. a substantially cylindrical body portion of transparent biaxially oriented amorphous modified polyethylene terephthalate polymer having a thickness of from 0.4 to 0.9 mm and an area expansion ratio of at least 7; and
  iii. a base portion of transparent amorphous substantially non-oriented or partly oriented modified polyethylene terephthalate polymer;
in which the modified polyethylene terephthalate polymer is a randomly modified polyethylene terephthalate made by replacing from 1 to 6 mole % of the terephthalate units with units of a chain orientation disrupting aromatic dicarboxylic acid having an Intrinsic Viscosity of at least 0.75 dl.g$^{-1}$.

17. A refillable pressure bottle as claimed in claim 1 wherein the modified polyethylene terephthalate polymer used contains from 1.8 to 3 mole % of units derived from iso-phthalic acid to replace terephthalate units and which contains fine metal particles, which intrinsically absorb radiation in the wavelength range 500 nm to 2000 nm, in a quantity such that the reheat time of the polymer is less than the reheat time of the polymer in the absence of that quantity of particles.

18. A method as claimed in claim 12 wherein the modified polyethylene terephthalate polymer used contains from 1.8 to 3 mole % of units derived from iso-phthalic acid to replace terephthalate units and which contains fine metal particles, which intrinsically absorb radiation in the wavelength range 500 nm to 2000 nm, in a quantity such that the reheat time of the polymer is less than the reheat time of the polymer in the presence of that quantity of particles.

* * * * *